Patented May 19, 1953

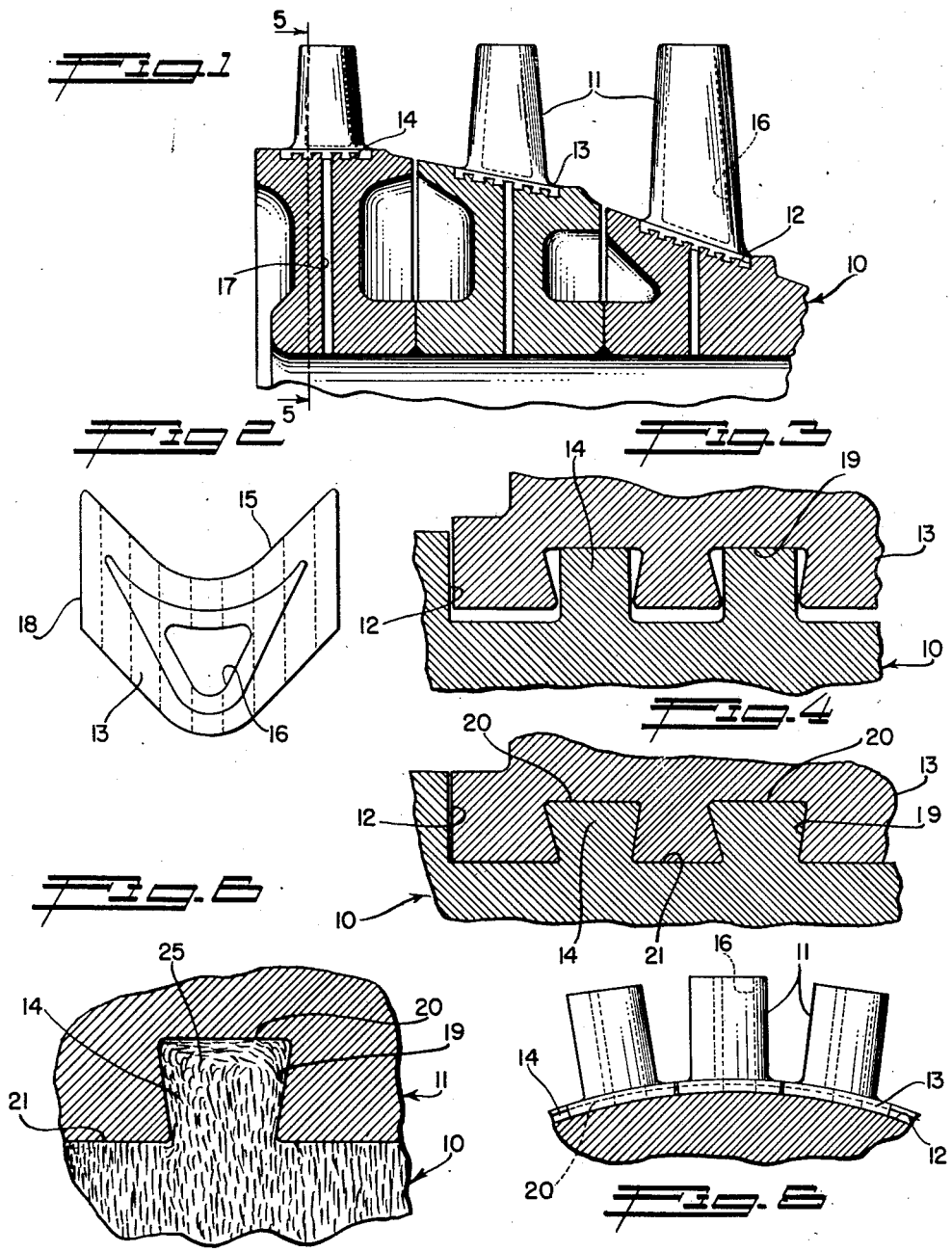

2,639,119

UNITED STATES PATENT OFFICE 2,639,119

ROTOR BLADE ATTACHMENT MEANS AND METHOD

Harold A. Greenwald, Los Angeles, Calif., assignor to Lockheed Aircraft Corporation, Burbank, Calif.

Application November 14, 1947, Serial No. 785,880

9 Claims. (Cl. 253—77)

This invention relates to the securing of turbine blades, compressor blades and the like to their respective rotors, and relates more particularly to blade attachments and the method of making the same.

While the present invention is not confined to any specific application, it is particularly well-suited to the attachment of blades and buckets to the rotors of turbo machines. At present a variety of purely mechanical means are employed to secure the blades to the rotors of turbines, compressors and the like. These include bolting, riveting and machined inter-fitting parts, such as bulbs, inverted T's, dovetails and "fir trees." Blades have also been attached to rotors by brazing and welding, employing the various welding methods, such as the electric arc, gas welding, electric resistance welding, etc. The mechanical attachments usually require increased expense in materials, machining time, tooling and assembling and necessitate considerable inactive material in the bases of the blades or in the peripheral portion of the rotor, or both. Inactive material may be defined as material of the blades which is not actually effective in the aerodynamic sense in accelerating the working fluid or in absorbing energy from the working fluid and as material of the rotor that does not assist in carrying the tangential or hoop stresses. Weight is an important consideration in high speed turbo machines, and a small amount of unnecessary inactive material at the blade attachments exerts a pull of as much as fifty thousand times its static weight on a high speed rotor, necessitating an appreciable increase in the weight of the rotor itself to limit the resultant stresses in the rotor. When welded blade attachments are employed, the inactive material may be kept at a desirable minimum only if the accuracy of the blade location and uniformity in the strength of the welds are maintained in production. In practice it is difficult to control production owing to the use of parts of unlike materials having unsymmetrical shapes. Insufficient fusion, cracking, and the development of cavities and oxidation also often contribute to inconsistencies in the strength of welded attachments.

A minimum of inactive material would be present in a construction where the blading and rotor ring are integral. This might be accomplished by machining the blades from a ring or by casting the entire unit. The machining of the buckets or blades from solid material to obtain hollow blades for cooling purposes and to reduce the amount of inactive material would be wholly impractical. Furthermore, it is usually desirable to construct the blade of a material having different physical characteristics than the material of the rotor. Casting the blades as part of a ring to be subsequently attached to a suitable rotor hub would be an extremely difficult casting operation and would probably not result in a sufficiently accurate location of the blades.

It is a general object of the present invention to provide a simple, practical means and method of rotor blade attachment that assure a reliable accurate attachment of adequate strength in which a minimum of inactive material is required.

It is another object of the invention to provide a method for attaching buckets or blades to rotors, and the like, which produces a combined mechanical and welded joint. The method of the invention results in a forged dovetailed attachment in which dovetailed parts on the rotor and blade base have mechanical engagement or interference and are also welded one to the other. The mechanical dovetailed elements may be designed to obtain approximately 45% of the strength based on the entire cross-sectional area of the joint and ultimate tensile strength of the weaker of the two metals employed in the rotor and blade. The pressure welding and fusion welding which accompanies the method joins both the dovetailed parts and the adjacent areas of the blade and rotor and is additive to the mechanical connection to bring the total joint efficiency to approximately 90%. The attachment may be designed so that the mechanical interference of the parts is adapted to carry the entire load and therefore all of the blades secured to the rotor by the present method will be reliably attached to the rotor. Furthermore, the parts need not have close tolerances prior to the forging and welding operation and accordingly, consistently effective attachments are easy of attainment in actual production.

Another object of the invention is to provide a blade attachment method of the character referred to that is simple and easy to perform and that results in the accurate location of the blades on the rotor. The machining of the rotor and the forming of the blades to adapt them for the attachment are simply and easily performed and the actual forging and welding of the dovetailed parts may be expeditiously carried out with a suitable welding machine equipped with a fluid pressure ram-actuated electrode. Simple machining of a groove in the rotor and the machining or forming of the base of the blade to engage in the groove assures accurate locating of the blade on the rotor when finally secured thereto.

A further object of the invention is to provide a blade attachment of the class referred to that is in the form of a welded, dovetailed joint having inter-fitting dovetailed parts that are welded together. The attachment has one or more dovetailed ribs on the rim of the rotor engaging in dovetailed grooves in the base of the blade to mechanically secure the blade to the rotor and said ribs and the walls of the grooves as well as adjacent parts of rotor and base are integrally joined or welded together. Thus, the joint or attachment combines the desirable attributes of both a mechanical and welded joint, and yet requires a minimum of inactive material at the rotor rim and blade base.

Other objectives and advantages of the invention will become apparent from the following detailed description of a typical preferred embodiment of the attachment means and method of making the same, throughout which description reference is made to the accompanying drawings wherein:

Figure 1 is a fragmentary longitudinal sectional view of a turbine rotor embodying the attachment means of the invention, showing the buckets or blades in side elevation;

Figure 2 is an enlarged plan view of one of the buckets;

Figure 3 is a greatly enlarged fragmentary sectional view showing a blade base in position prior to attachment to the rotor;

Figure 4 is a view similar to Figure 3 showing the attachment completed;

Figure 5 is an enlarged fragmentary sectional view taken substantially as indicated by line 5—5 on Figure 1; and Figure 6 is a greatly enlarged sectional view of a portion of an attachment illustrating the grain structure of the metal in the tongue or rib element of the attachment.

As mentioned above, the invention has extensive application and therefore is not to be construed as restricted to the specific embodiment and application herein disclosed. In the drawings I have shown the attachment means embodied in a turbine rotor of the type employed in gas turbine power plants, it being understood that this is merely one typical embodiment and that the invention may be employed in a like manner to secure the blades on single or multiple blading row compressor rotors, etc. I will first proceed with a description of the structure of the joints or attachments and will then describe the method of making the attachments.

The particular rotor 10 illustrated carries a plurality of rows of blades 11, the blades of the adjacent rows being graduated in length and the rim or periphery of the rotor being tapered. The rim of the rotor 10 is provided with circumferential annular grooves 12 for receiving the bases 13 of the buckets or blades 11. The grooves 12 may have straight, radial or parallel side walls and the bottom walls of the grooves are concentric with the adjacent peripheral surface portions of the rotor 10. Circumferentially extending ridges or ribs 14 extend from the bottom of each groove 12. In the particular construction illustrated there is a plurality of spaced parallel ribs 14 on the bottom wall of each groove 12. The ribs 14 are preferably annular and continuous and may be alike or identical. The ribs 14 being continuous are adapted to carry tangential stresses and are therefore "active" material. As shown in the drawings, the ribs 14 are integral with the rotor or rotor rim and may be easily machined thereon. As initially formed or machined the ribs 14 have parallel sides as shown in Figure 3, but upon being forged during the attaching process, to be subsequently described, their sides are made outwardly divergent as illustrated in Figure 4. Thus, in the completed joint or attachment the ribs 14 are of dovetailed or outwardly flared cross section.

The blades or buckets 11 of each row are usually identical and each blade comprises the blade body and a base 13. The blades 11 may be hollow to reduce the amount of inactive material required and to permit internal cooling. The internal cavities 16 of the blades 11 may extend from the blade tips to the bases 13 where they communicate with cooling air passages 17 in the rotor 10. The bases 13 of the blades 11 are shaped and proportioned to rather accurately fit their respective rotor grooves 12 and have flat parallel ends 18 which have slight clearance with the side walls of the grooves when the blades are inserted therein. The bases 13 have cylindrically concaved lower or inner surfaces for fairly accurately conforming with the bottom walls of the grooves. This forming and proportioning of the bases 13 assures the accurate locating of the blades 11 on the rotor 10. The sides 15 of the bases 13 are preferably shaped to follow generally the contour of the blades proper, being concave at one side of the base and convex at the other, the sides of the adjacent blade bases being shaped to nest or engage one with the other.

The inner or under sides of the bases 13 have grooves 19 for receiving or cooperating with the above described ribs 14 of the rotor 10. The grooves 19 extend completely across the bases 13 from one side to the other and their inner or bottom walls are substantially concentric with the bottom walls of the rotor grooves 12 when the blades are secured in position on the rotor. The side walls of the grooves 19 converge toward the entrances to the grooves, that is toward the rotor 10. The grooves 19 as machined or cast and the ribs 14 as initially machined are related and proportioned so that the ribs 14 may enter the restricted mouths of the grooves with only slight tolerance and the tops of the ribs engage the inner walls of the grooves to hold the blade base 13 spaced from the bottom wall of the rotor groove 12. This is illustrated in Figure 3. However, when the ribs 14 are forged or spread during the attaching method, the metal of the ribs spreads into the dovetailed grooves 19 to conform thereto and the bottom surfaces of the blade bases 13 engage with the bottom walls of the grooves 12 as shown in Figure 4. It will be seen that the mechanical interference or cooperation of the dovetailed ribs 14 and dovetailed grooves 19 securely and dependably attaches the blades 11 to the rotor 10. The plurality of spaced rib and groove connections at each blade base effectively distributes the loads occurring during operation of the rotor and allows the use of rather thin, light blade bases. In addition to the mechanical connections just described, the crests and sides of the ribs 14 and the walls of the grooves 19 are pressure welded and fusion welded together as at 20. In addition, the bottom of the blade base 13 and the bottom wall of the rotor groove 12 are welded together as at 21. This welding together of the rotor 10 and blade base 13 materially increases the strength of the attachment. Thus, the attachment of each blade is in the nature of a multiple forged and welded dovetailed joint of great strength and durability. The manner of forging the ribs 14 and welding the parts will be described below.

The blade attachment method of the invention may be said to comprise the following general steps or acts; the forming of a groove 12 and the ribs 14 on the rotor 10, the forming of the dovetailed grooves 19 in the blade base 13, the arrangement of the blade 11 on the rotor 10 so that the ribs 14 are received in the grooves 19, the forging of the ribs 14 in the grooves 19 to conform thereto and the welding of the blade base to the rotor.

It is believed that it will be readily apparent how the grooves 12 and ribs 14 may be machined in the rotor 10 or rotor rim. It may be noted in this connection that the grooves 12 may be relatively shallow so that the rim of the rotor 10 may likewise be relatively thin. The blades 11 are usually constructed of a heat and corrosion resistant material and may be cast or forged. In such cases the dovetailed grooves 19 are cast, machined or broached directly in the blade bases 13. It will be observed that the preparation of the rotor 10 and the blades 11 may be easily and inexpensively accomplished.

In initially assembling a blade 11 on the rotor 10 the blade is mounted in an electrode so that the lower end of the electrode engages the upper side of the base 13. This electrode may be secured to the ram of a standard or conventional type welding machine in such a manner that the ram load of the machine may be imposed upon the electrode and blade. The welding machine disclosed in United States Letters Patent Number 2,426,746, granted September 2, 1947, is well adapted for use in carrying out the method of the invention, although it is to be understood that the method is not confined to this particular machine. The rotor 10 and the blade 11 are brought to the relative positions where the blade base 13 is engaged in the rotor groove 12 and the ribs 14 are received in the grooves 19 so that the tops of the ribs engage the inner walls of the grooves as shown in Figure 3. Then assuming that the rotor 10 is held stationary and the blade 11 is engaged in the electrode as just described, the blade is forcibly pressed against the rotor and a selected electrical current is caused to flow through the electrode, the blade base 13 and the rotor 10. In the initial phases of this operation the only points or areas of contact between the blade 11 and the rotor 10 are where the tops of the ribs 14 and the walls of the grooves 19 engage and these areas are of the highest electrical resistance in the circuit. Accordingly, these areas are the first to reach a sufficiently high temperature to allow plastic deformation under the applied ram load. This plastic deformation or forging is in the nature of a lateral spreading or "mushrooming" of the ribs 14 and the ribs spread laterally until they conform with the side walls of the dovetailed grooves 19. The grooves 19 in effect constitute die cavities in which the initially straight sided ribs 14 are given the dovetailed configuration. The temperatures attained during the forging operation are preferably in the upper forging temperature range of the rotor material. Due to surface irregularities of the parts localized areas reach higher temperatures to produce an appreciable amount of pressure welding and fusion welding of the ribs 14 with the metal of the blade base 13. The forging of the ribs 14 brings the inner face of the blade base 13 into engagement with the bottom wall of the groove 12. When this has occurred, the pressure is maintained on the blade 11 and the electrical circuit is also maintained to produce the abovementioned welding together of the bottom of the blade base 13 and the bottom wall portions of the rotor groove 12. The electrical current is then cut off and the pressure on the blade is relieved whereupon the welding machine electrode is detached from the blade 11 to complete the process. The ribs 14 are preferably initially of slightly greater volume than their respective portions of the grooves 19 to assure the complete filling of the grooves by the forged ribs and to compensate for the slight decrease in volume that occurs when the metal is compressed.

As previously mentioned, the blades of a turbine rotor are usually formed of a very highly heat resistant material such as a chromium, cobalt, molybdenum and nickel alloy, and the rotor is usually formed of material such as a chromium, nickel, molybdenum and iron alloy. In such instances the rotor material is stronger than the blade material until a temperature of about 1500° F. is reached but is weaker from this temperature up to the melting point which is approximately the same for both metals. In carrying out the method of the invention with such materials the forging and welding temperature range at the attachment may be held within the limits of from 1600° to 2400° F. Within this considerable temperature range the weaker rotor material deforms into the grooves 19 in the stronger blade material which acts as a forging die. In the extreme lower portion of the operative temperature range there may be little or no welding and a mechanical joint only is formed. However, in the upper portions of the temperature range, say from 2000° to 2400° F., a considerable pressure welding accompanies the forging operation and since some localized areas may reach a temperature as high as 2500° F., there is some fusion welding, the latter occurring with little or no metal expulsion or resultant cavities. The extensive temperature range in which the method is operative assures reliable attachments in production work and makes the method much simpler and more consistent than the conventional fusion welding techniques where the temperature range is narrow and critical.

The magnitude of the electrical current, the pressure applied to the blade and the time during which the resistance heating current is applied are variable and depend upon such factors as the character of the metals of which the blade and rotor are constructed, the size and shape of the blade base, the number, size and length of the dovetailed grooves, etc. In most cases it is desirable not to have the current magnitude too high and to extend the time of applying the pressure and current so as to obtain an effective distribution of heat over the entire joint area and thereby produce extensive and well distributed regions where welding occurs.

The plastic deformation or forging of the slightly oversized ribs 14 causes or is accompanied by radial compression of the rotor rim material around the circumference of the rotor to introduce a compressive stress in the rim in the radial direction because the diameter of the rim is slightly reduced. A compressive tangential stress is also set up. This tangential compressive stress must be overcome during operation of the rotor before tangential tensile stresses are set up by reason of rotation of the rotor. The forging operation also changes the direction of the grain of the metal in the ribs 14 from approximately parallel radial fibers in the machined rib to curved interlocking fibers in the forged rib. This increases the fatigue and impact strength of the material in these regions. Figure 6 illustrates in a general manner the grain structure of a forged rib 14, the lines at 25 representing the curved interlocking fibers.

While I have shown the ribs 14 and the grooves 19 extending circumferentially of the rotor 10, it will be apparent that where the sides of the rotor discs are accessible the attachment ribs and grooves may extend axially of the rotor assembly. The general structure and mode of attachment would be substantially the same as described above, however, where the ribs and grooves extend axially additional inactive material is introduced at the attachments.

The method of the invention is also adapted for the attachment of blades constructed of ceramic materials, etc., that cannot be welded to metal rotors. In such cases the forging phase of the method, in which the ribs 14 on the rotor are forged in dovetailed grooves in the blades, serves to securely and dependably attach the blades to the rotor. The forging, in such cases, may be accomplished by heating the rim portion of the rotor by electrodes applied to the sides of the rotor adjacent its periphery and passing an electrical current through the rotor, or by other means to bring the ribs 14 to a plastic temperature and forcibly pressing the blade against the rotor so that the ribs are forged into the grooves 19 to conform thereto, as described above.

From the foregoing description it will be seen that I have provided a practical, dependable blade attachment and a simple expeditious method for attaching blades to rotors and the like. The attachments may be designed so that the mechanical interference of the dovetailed ribs 14 and grooves 19 alone is sufficiently strong to carry the blade load for the desired life of the machine. The pressure welding and fusion welding at the areas 20 and 21 which accompanies and immediately follows the forging of the dovetailed ribs 14 provides additional strength to obtain an extremely high joint efficiency. Consistently strong effective attachments are assured because very close tolerances are not required and the temperature range for the forging and welding operations is relatively wide. The blades 11 are accurately located by reason of the fit of the blade bases 13 in the grooves 12. The base 13 of the blade cooperates with the bottom wall of the rotor groove 12 to provide a positive stop which orients the blade both radially and in various angular directions. These several considerations adapt the method for the production attachment of compressor blades, rotor blades, and the like, to rotors, etc.

Having described only a typical preferred embodiment of the invention, I do not wish to be limited to the specific details herein set forth but wish to reserve to myself any features or modifications that may fall within the scope of the following claims.

I claim:

1. The method of attaching a heat resistant metal blade to a rotor of softer less heat resistant metal which comprises the steps of providing a dovetailed groove in the blade, forming a rib on the rotor, arranging the blade on the rotor so that the groove receives the rib, and then forging the rib so that it conforms to the groove by pressing the rotor and blade together while subjecting the rib to a sufficiently high temperature to render it plastic so as to deform under said pressure and without heating the blade to a plastic condition.

2. The method of attaching a heat resistant metal blade to a rotor of softer less heat resistant metal which comprises the steps of providing a dovetailed groove in the blade, forming a rib on the rotor, arranging the blade on the rotor so that the groove receives the rib with the crest of the rib engaging the inner wall of the groove, and then forging the rib to conform with the dovetailed groove by pressing the rotor and blade together while passing an electrical current through the blade and rotor to raise the rib to a forging temperature to plastically deform under the applied pressure which temperature is below the temperature of plasticity of the blade.

3. The method of attaching a heat resistant metal blade to a rotor of softer less heat resistant metal which comprises the steps of providing a dovetailed groove in the blade, forming a rib on the rotor, arranging the blade on the rotor so that the groove receives the rib with the crest of the rib engaging the inner wall of the groove, and then forging the rib to conform to the contour of the dovetailed groove and simultaneously welding the rib with the wall of the groove by forcibly pressing the rotor and blade together while passing an electrical current through the blade, rib and rotor to raise the temperature of the crest portion of the rib to a forging and welding temperature, the grooved portion of the blade remaining at a temperature below the temperature of plasticity of blade metal.

4. The method of attaching a blade formed of a metal having a high temperature of plasticity to a rotor formed of a metal having a lower temperature of plasticity which comprises the steps of providing a dovetailed groove in the base of the blade, providing a rib on the rotor having generally parallel sides and having a transverse cross sectional area slightly greater than the transverse cross sectional area of the groove, arranging the blade and rotor so that the rib is received in the groove with its crest engaging the inner wall of the groove to space the base of the blade from the rotor, and then simultaneously forging the rib to conform with the dovetailed groove and welding the rib in the groove by forcibly pressing the blade and rotor together while passing an electrical current through the base, rib and rotor to bring the crest portion of the rib to a forging and welding temperature, the blade remaining in the non-plastic state during said forging and welding.

5. The method of attaching a blade formed of a metal having a high temperature of plasticity to a rotor formed of a metal having a lower temperature of plasticity which comprises the steps of providing a peripheral groove in the rotor with a rib on the wall of the groove, providing a dovetailed groove in the base of the blade, positioning the blade base in the peripheral groove so that the rib is received in the dovetailed groove with its crest engaging the inner wall of the dovetailed groove to space the base from the wall of the peripheral groove, simultaneously forging the rib to conform with the dovetailed groove and welding the rib in the groove by pressing the blade and rotor together while passing an electrical current through the base, rib and rotor, said forging of the rib bringing the base into contact with the wall of the peripheral groove, and then welding the base in said peripheral groove by maintaining said pressure upon the blade and rotor while maintaining said current flow through the base and rotor, the blade remaining in the non-plastic state during said forging and welding.

6. In combination, two metal elements, one element being formed of harder material more resistant to deformation than the material of the other element, one element being a rotor, the other a blade, the element formed of said harder material having a dovetailed groove, a dovetailed rib on the other element extending into and closely conforming to the groove, said rib having the fibers of its metal curved, interlocked and following generally the contours of the surfaces of the rib, and metal of the two elements united in a weld at said groove and rib.

7. In combination, two metal elements, one element being formed of harder material more resistant to deformation than the material of the other element, one element being a rotor, the other a blade, the element formed of said harder material having a dovetailed groove, and a dovetailed rib on the other element extending into and closely conforming to the groove, the fibers of the metal of the rib being curved, interlocking and in part following generally the contours of the rib.

8. In combination, a metal rotor having a peripheral groove, a blade of harder less readily deformable metal than the rotor having a broadened base seated within said peripheral groove, said base having a dovetailed groove extending peripherally of the rotor and provided with an inner wall curved about the rotational axis of the rotor and side walls converging from said inner wall toward said axis, a rib on the rotor projecting into said peripheral groove and shaped and proportioned to occupy and conform to said dovetailed groove, the fibers of the metal of the rib following generally the external contours of the rib in the regions of the rib adjacent its exterior, and a welded bond between the metal of the rib and the metal of the rotor.

9. In combination, a metal rotor having a peripheral groove, a metal blade having a broadened base seated in said peripheral groove, the base having a plurality of axially spaced dovetailed grooves, axially spaced ribs on the rotor projecting radially therefrom and shaped and arranged to occupy and conform to said dovetailed grooves, the fibers of the metal of the ribs following generally the external contours thereof in the regions of the ribs adjacent their exteriors, a welded bond between the metal of said base and the metal of the rotor at said peripheral groove, and welded bonds between the metal of said ribs and the metal of the blade at said dovetailed grooves.

HAROLD A. GREENWALD.

References Cited in the file of this patent

UNITED STATES PATENTS

| Number | Name | Date |
| --- | --- | --- |
| 478,643 | Scott | July 12, 1892 |
| 578,801 | Wilmot | Mar. 16, 1897 |
| 596,792 | Schmidt | Jan. 4, 1898 |
| 822,801 | Wilkinson | June 5, 1906 |
| 906,400 | DeFerranti | Dec. 8, 1908 |
| 927,445 | Barton | July 6, 1909 |
| 980,562 | Rice | Jan. 3, 1911 |
| 1,063,357 | Lachman | June 3, 1913 |
| 1,148,221 | DeFerranti | July 27, 1915 |
| 1,648,026 | Murray | Nov. 8, 1927 |
| 2,448,825 | Price | Sept. 7, 1948 |
| 2,479,039 | Cronstedt | Aug. 16, 1949 |

FOREIGN PATENTS

| Number | Country | Date |
| --- | --- | --- |
| 4,603 | Great Britain | Aug. 24, 1905 |
| 14,051 | Great Britain | 1915 |
| 14,964 | Great Britain | 1908 |